Patented Nov. 10, 1953

2,658,896

UNITED STATES PATENT OFFICE 2,658,896

REDUCTIVE PROCESS FOR PREPARING PTEROYL-GLUTAMIC ACID

Hans Kirchensteiner, Basel, Heinrich Klaeui, Riehen, near Basel, and Herbert Lindlar, Basel, Switzerland, assignors to Hoffmann-La Roche Inc., Nutley, N. J., a corporation of New Jersey No Drawing. Application February 28, 1948, Serial No. 12,147

1 Claim. (Cl. 260—251.5)

The present invention relates to the manufacture of folic acid.

Folic acid may be obtained synthetically by reacting with each other 2,4,5-triamino-6-hydroxypyrimidine, p - aminobenzoyl - 1 - (+) - glutamic acid and 2,3-dibromopropionaldehyde (Science, vol. 103 [1946], page 667); or by condensing the quaternary ammonium base corresponding to N-[(2-amino-4-hydroxy-6-pteridyl)-methyl]-pyridinium iodide with p-aminobenzoyl-1-(+)-glutamic acid.

It has now been found, according to the present invention, that folic acid can be readily obtained by catalytically reducing 2-amino-4-hydroxy-6-pteridyl-aldehyde in the presence of p-aminobenzoyl-1-(+)-glutamic acid.

Accordingly, a process is provided for the manufacture of folic acid in which 2-amino-4-hydroxy-6-pteridyl-aldehyde is catalytically reduced in the presence of p-aminobenzoyl-1-(+)-glutamic acid.

The 2-amino-4-hydroxy-6-pteridyl-aldehyde used as starting material may be obtained by reacting 2-amino-4-hydroxy-6-(tetrahydroxybutyl)-pteridine with an oxidant apt to bring about glycolic cleavage; the said tetrahydroxybutyl-pteridine, in turn, can be prepared by condensation of 2,4,5-triamino-6-hydroxy-pyrimidine with a ketohexose.

The 2-amino-4-hydroxy-6-pteridyl-aldehyde is catalytically reduced together with p-aminobenzoyl-1-(+)-glutamic acid in an appropriate solvent, such as formic acid. It is advisable to effect the reduction under elevated pressure; in case formic acid is used as solvent the same acts, at temperatures above 50° C., as a formylating agent upon the folic acid formed, resulting in the production of formyl pteroyl glutamic acid, or formyl folic acid, which can be represented by the following formula:

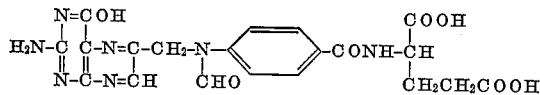

The following examples illustrate the process of the present invention:

Example 1

10 parts by weight of 2-amino-4-hydroxy-6-pteridyl-aldehyde are dissolved in 400 parts by volume of anhydrous formic acid. 14 parts by weight of p-aminobenzoyl-1-(+)-glutamic acid are added to the solution and the mixture is heated for 1 hour to 67° C. Thereupon, it is cooled to +20° C. and hydrogenated under normal pressure after addition of 5 parts by weight of 10 per cent. palladium charcoal. After 1 mol of hydrogen has been taken up the hydrogenation is discontinued and the catalyst is sucked off.

The filtrate is stirred into 5000 parts by volume of ether; the precipitate formed thereby is sucked off and washed with absolute alcohol. After drying at 55° C. the residue is dissolved in 3000 parts by volume of 0.5 per cent. aqueous ammonia. The solution is diluted with water to a volume of 9000 parts whereupon 20 parts by volume of a 25 per cent. bariumchloride solution are added. The precipitate formed thereby is filtered off after standing for 2 hours. The barium is precipitated from the filtrate by addition of 35 parts by volume of a 10 per cent. sodium sulfate solution; after separating the barium sulfate the solution is concentrated under reduced pressure to 8000 parts by volume and set to a pH of 6 by means of hydrochloric acid and filtered. The light yellow filtrate is acidified to a pH of 3.2 by addition of hydrochloric acid and left to stand overnight in an ice-box. 2.05 parts by weight of 60 per cent. folic acid are obtained. The filtrate is concentrated under reduced pressure to 1000 parts by volume, filtered and set to a pH of 3.2, whereupon, after allowing to stand in an ice-box overnight, 1.62 parts by weight of 100 per cent. folic are obtained.

Example 2

A mixture of 0.5 part by weight of 2-amino-4-hydroxy-6-pteridyl-aldehyde and 0.7 part by weight of p-aminobenzoyl-1-(+)-glutamic acid in 30 parts by volume of anhydrous formic acid is catalytically hydrogenated for 3½ hours at 50° C. and 100 atm. starting pressure. The mixture is worked up in accordance with Example 1. The micro-biological determination shows 0.155 part by weight of folic acid to be present.

We claim:

A method of preparing pteroylglutamic acid which comprises reacting 2-amino-4-hydroxy-6-pteridyl aldehyde with paraminobenzoylglutamic acid in the presence of hydrogen and a hydrogenating catalyst.

HANS KIRCHENSTEINER.
HEINRICH KLAEUI.
HERBERT LINDLAR.

References Cited in the file of this patent

UNITED STATES PATENTS

| Number | Name | Date |
|---|---|---|
| 2,478,404 | Keresztesy et al. | Aug. 9, 1949 |

OTHER REFERENCES

Angier et al.: Science 103, 667–69 (1946).
Wolf et al.: J. Am. Chem. Soc. 69, 2753–59 (1947).